United States Patent
Guda

(10) Patent No.: US 11,733,923 B2
(45) Date of Patent: Aug. 22, 2023

(54) GENERATING COMMAND SNAPSHOTS IN MEMORY DEVICES

(71) Applicant: Micron Technology, Inc., Boise, ID (US)

(72) Inventor: Chandra M. Guda, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 99 days.

(21) Appl. No.: 17/369,073

(22) Filed: Jul. 7, 2021

(65) Prior Publication Data

US 2023/0008307 A1    Jan. 12, 2023

(51) Int. Cl.
*G06F 3/06* (2006.01)
*G06F 11/36* (2006.01)

(52) U.S. Cl.
CPC .......... *G06F 3/0659* (2013.01); *G06F 3/0604* (2013.01); *G06F 3/0679* (2013.01); *G06F 11/3656* (2013.01)

(58) Field of Classification Search
None
See application file for complete search history.

(56) References Cited

U.S. PATENT DOCUMENTS

| 7,944,234 | B2 * | 5/2011 | Lunzer | G01R 31/31928 714/39 |
|---|---|---|---|---|
| 2010/0174955 | A1 * | 7/2010 | Carnevale | G11C 29/16 714/E11.169 |
| 2012/0216079 | A1 * | 8/2012 | Fai | G06F 11/362 714/E11.055 |
| 2015/0309742 | A1 * | 10/2015 | Amidi | G06F 9/30 714/773 |
| 2016/0140007 | A1 * | 5/2016 | Cho | G06F 11/2205 714/42 |
| 2017/0083393 | A1 * | 3/2017 | Datta | G06F 11/27 |
| 2017/0199831 | A1 * | 7/2017 | Brainard | G06F 13/1689 |
| 2017/0308433 | A1 * | 10/2017 | Kwon | G11C 29/52 |
| 2018/0307630 | A1 * | 10/2018 | Rusten | G06F 13/1668 |

* cited by examiner

*Primary Examiner* — Nathan Sadler
(74) *Attorney, Agent, or Firm* — Lowenstein Sandler LLP

(57) ABSTRACT

Systems and methods are disclosed including a processing device operatively coupled to memory device. The processing device performs operations comprising receiving a memory access command specifying a logical address; determining a physical address associated with the logical address; determining a portion of the memory device that is referenced by the physical address; determine an endurance factor associated with the portion; and increasing, by a value derived from the endurance factor, a media management metric associated with a management unit of the memory device, wherein the management unit is referenced by the physical address.

18 Claims, 5 Drawing Sheets

GENERATING COMMAND SNAPSHOTS IN MEMORY DEVICES

TECHNICAL FIELD

Embodiments of the disclosure generally relate to memory sub-systems, and more specifically, relate to generating command snapshots in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
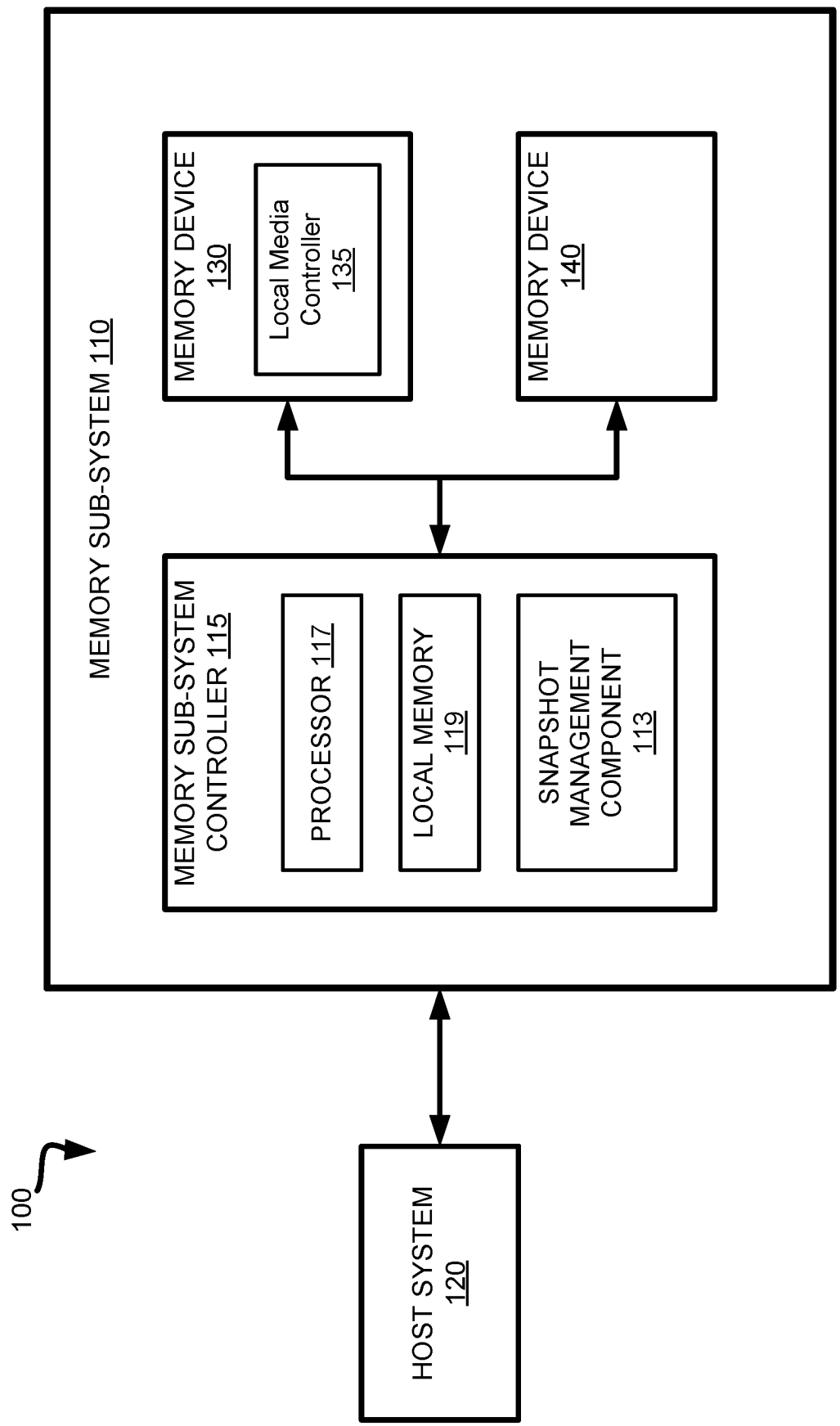
FIG. 1 illustrates an example computing system that includes a memory sub-system in accordance with some embodiments of the present disclosure.

Aspects of the present disclosure are directed to generating command snapshots in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Memory access operations can be performed by the memory sub-system. The memory access operations can be host-initiated operations or memory sub-system controller initialed. For example, the host system can initiate a memory access operation (e.g., write operation, read operation, erase operation, etc.) on a memory sub-system. The host system can send memory access commands (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc. Memory access operations initiated by the memory sub-system controller can relate to maintenance operations, such as garbage collection, wear leveling, bad block management, block refresh operations, etc.

While processing the memory access commands, the memory sub-system can experience quality of service issues, such a latency caused by defects (i.e., "bugs") in the electronic device, such as a memory sub-system. Debugging can involve finding and reducing the number of defects. Various debugging techniques can be used to detect anomalies, assess their impact, and schedule hardware changes, firmware upgrades, or full updates to a system. The goals of debugging include identifying and rectifying defects in the system (e.g., logical or synchronization problems in the firmware, or a design error in the hardware), and collecting system state information. System state information can include various information related to the operation of the memory sub-system, and can be used to analyze the memory sub-system to find ways to boost its performance or to optimize other important characteristics.

One example of system state information can include event data generated in the memory sub-system. An event, as used herein, generally refers to a detectable change of state caused by an action performed by hardware, software, and/or firmware in the memory sub-system. Examples of events include a memory sub-system controller sending and/or receiving data or accessing a memory location of a memory device, a warning related to some reliability statistic (e.g., raw bit error rate (RBER), wear leveling, etc.) of a memory device, an error experienced by the memory sub-system controller in reading data from or writing data to a memory device, garbage collection, encoding and/or decoding, retrieving memory access commands from a queue(s) (e.g., a scheduling queue, a submission queue, etc.), data reconstruction, direct memory access (DMA) operations, media scans, or any other event relating to memory access operations. Data relating to the event can include time data (e.g., a timestamp of when execution of the event began, a timestamp of when execution of the event concluded, timer data relating to the duration of executing the event, etc.), metric data (e.g., data relating to metrics used by the memory sub-system), error handling data (e.g., types of error handling operations performed), queueing data, etc.

Point-in-time debug information can be important to analyzing events being reported from customer use and/or during the qualification of the memory sub-system (e.g., an SSD). Debug information can include a snapshot of the state of the memory sub-system taken during the time that the reported issue occurred (e.g., an error or a failure). In particular, a snapshot can save the state of memory device registers, the memory, and other critical data area. Analyzing the debug information can help determine the root cause of the issue. In order to create a snapshot, each CPU core saves its hardware registers and/or other important regions of memory.

In some systems, the memory sub-system can be configured to generate multiple snapshots (periodic snapshots, snapshots during a specified time range, etc.) to sample event data from the memory sub-system and store the captured data in a data structure (e.g., a log file). The memory sub-system can then send the log to the host system for analysis. For example, the host system 120 can analyze the log data (such as timestamp data) to determine whether and when latency issues occurred.

However, sampling via multiple snapshots can generate significant latency issues in the memory sub-system. For example, sampling can consume thousands of instruction cycles for capturing and extracting the debug information. Furthermore, sending the log file, to the host system, that contains data relating to thousands of snapshots can consume additional instruction cycles, which further worsens the experienced latency. In other memory sub-systems, sampling via multiple snapshots can require a large and costly infrastructure. Accordingly, a system capable of capturing debug information without adversely affecting the performance of the memory sub-system is desirable.

Aspects of the present disclosure address the above-noted and other deficiencies by enabling the memory sub-system to perform a command snapshot process. In particular, the memory sub-system controller can first determine whether a received memory access command satisfies a trigger condition. The trigger condition can be satisfied due to the memory access command specifying a certain logical address or a certain logical address range, a memory access command type (e.g., a read command, a write command, an erase command, a deallocate command, etc.), the memory access command occurring at a predefined interval value (e.g., each thousandth memory access command, each ten thousandth memory command, etc.), any other software based trigger, any firmware based trigger, any external trigger, etc. In response to the memory access command satisfying the trigger condition, the memory sub-system controller can enable write operations on a set of debug registers. The debug register can be located on the memory sub-system controller and/or on the memory device. Each debug register can be used to capture event data generated by the memory access command. In one embodiment, the memory sub-system can include a set of four debug registers. The first debug register can store time data (e.g., a timestamp of when execution of the event began, a timestamp of when execution of the event concluded, timer data relating to the duration of executing the event, etc.) relating to retrieving the memory access command from a memory access command queue. The second debug register can record time data relating to accessing the memory device. The third debug register can record time data relating to error handling and/or encoding and decoding operations performed on the memory access command. The fourth debug register can record time data relating to completion of the memory access command. In response to capturing the event data, the memory sub-system controller can disable write operations on the set of debug registers to prevent a subsequent memory access command from overwriting the captured event data prior to the memory sub-system controller extracting the captured event data from the set of debug registers. The memory sub-system controller can further set an indication that the set of debug registers contain event data.

In some embodiments, responsive to detecting the indication that the set of debug registers contain event data, the memory sub-system controller can extract the event data from the set of debug registers and generate a log file. The memory sub-system controller can the store the log file on the memory device, send the log file to the host system, etc. In some embodiments, the memory sub-system controller can append the log file to the memory access command. For example, in response to receiving a read command, the memory sub-system controller can capture the event data relating to the read command, using the set of debug registers, and then append the log containing the event data to read data sent to the host system.

In some embodiments, in response to a subsequent memory access command satisfying the trigger condition, the memory sub-system controller can enable write operations on another set of debug registers (e.g., another set of four debug registers). Thus, each debug register of the second set can be used to capture event data generated by the subsequent memory access command. By switching to the second set of debug registers, the memory sub-system controller can capture event data relating to the subsequent memory access command while extracting captured data from the first set of debug registers. The memory sub-system controller can alternate between sets of debug registers for subsequent memory access commands.

Advantages of the present disclosure include, but are not limited to, providing an improved system for capturing snapshots in response to specific software, hardware, or firmware triggers. These snapshots provides targeted point-in-time debug information, which can be used to determine the root cause of the issue that led to quality of service issues (e.g., latency issues) or system failure. In addition, these snapshots provide targeted point-in-time debug information relating to queueing data, error handling operations, etc. Aspects of the present disclosure provide reduced latency in capturing the debug state (registers, memory, and/or debug information) by enabling the hardware and/or software to capture event data using dedicated sets of debug registries, thus improving the performance of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

The memory device 130 can include one or more decks. A deck can be defined as an array of memory cells with electronically conductive access lines. Multiple decks can be stacked within memory device 130. Each deck can have inherently different levels of endurance (e.g., an indication of approximately how many times the deck can be written to, read, and/or erased before physical wear causes the deck to fail).

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as media management operations, garbage collection operations, error detection and error-correcting code (ECC) operations, encryption operations, caching operations, and address translations between a logical address (e.g., logical block address (LBA), namespace) and a physical address (e.g., physical management unit address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 135) on the die and a controller (e.g., memory sub-system controller 115) for media management within the same memory device package. An example of a managed memory device is a managed NAND (MNAND) device.

The memory sub-system 110 includes a snapshot management component 113 that can used to perform a snapshot process (e.g., capture event data) for each memory access command that satisfies a trigger condition. In some embodiments, the memory sub-system controller 115 includes at least a portion of the snapshot management component 113. In some embodiments, the snapshot management component 113 is part of the host system 110, an application, or an operating system. In other embodiments, local media controller 135 includes at least a portion of snapshot management component 113 and is configured to perform the functionality described herein.

The snapshot management component 113 can configure a trigger condition(s). The trigger condition can be related to any process, characteristic, or data related to a memory access command. In some embodiments, the trigger condition can relate to logical address information. For example, the trigger condition can indicate a certain logical address (e.g., LBA 23), a certain logical address range (e.g., LBA 24-30), multiple certain logical addresses, multiple certain logical address ranges, or any combination thereof. To satisfy this trigger condition, a memory access command can specify the logical address indicated by trigger condition. In some embodiments, the trigger condition can relate to a memory access command type. The memory access command type can include a read command, a write command, an erase command, a deallocate command, etc. To satisfy this trigger condition, the memory access command can be of the type indicated by the trigger condition.

In some embodiments, the trigger condition can include a periodic command. The periodic command can relate to a memory access command that occurs at a predefined interval value. For example, the periodic command can be set to a predetermined value (e.g., each thousandth memory access command, every memory access command at 10 millisecond intervals, etc.). The snapshot management component 113 can maintain a memory access command counter, where each memory access command received by the memory sub-system controller 115. The trigger condition can be satisfied responsive to the memory access command counter satisfying a threshold criterion (e.g., the predefined interval value).

In some embodiments, the trigger condition can include a firmware based trigger. The firmware based trigger can include any condition that can be generated or implemented by firmware of the memory sub-system 110. For example, a firmware based trigger can include the condition that in response to an event or process occurring while processing a previous memory access command, perform the snapshot process in for the subsequent memory access command. In some embodiments, the trigger condition can include an external trigger. The external trigger can include a command issued by an external device (e.g., Peripheral Component Interconnect (PCI) device) coupled to a sideband management interface (e.g., system management bus (SMBus)). For example, an external device may receive statistics data, temperature data, or any other data related to the memory sub-system 110. In response an external device based criterion being satisfied (e.g., temperature value crosses a threshold value), the external device can instruct the snapshot management component 113 to perform the snapshot function.

The trigger condition(s) can be configurable by the host system 120. In some embodiments, the host system can enable a trigger condition from a predetermined set of trigger conditions. In some embodiments, host system 120 can configure a trigger condition from the predetermined set of trigger conditions. For example, the host system 120 can set the logical address trigger condition to be satisfied when a memory access command specifies a specific logical address (e.g., LBA 23). In some embodiments, the snapshot process operations can be enabled and disabled by the host system 120.

In response to the memory access command satisfying the trigger condition, snapshot management component 113 can enable write operations on a set of debug registers. The debug registers can be located on snapshot management component 113, memory device 130, and/or memory device 140. Each debug register can be configured to capture and store data relating to an event (a detectable change of state caused by an action performed by hardware, software, firmware, or a combination thereof). Thus, snapshot management component 113 can use each debug register to capture data relating to different events performed by the execution of the memory access command. An event can generally refer to a detectable change of state caused by an action performed by hardware, software, firmware, or a combination of any of the above in the memory sub-system. Examples of events include a memory sub-system controller sending and/or receiving data or accessing a memory location of a memory device, a warning related to some reliability statistic (e.g., raw bit error rate (RBER), wear leveling, etc.) of a memory device, an error experienced by the memory sub-system controller in reading data from or writing data to a memory device, garbage collection, encoding and/or decoding, retrieving memory access commands from a queue(s) (e.g., a scheduling queue, a submission queue, etc.), data reconstruction, direct memory access (DMA) operations, media scans, or any other event relating to memory access operations.

In some embodiments, the data captured by the debug registers can include time data relating to the corresponding event. For example, the time data can include a timestamp of when execution of the event began, a timestamp of when execution of the event concluded, timer data relating to the duration of executing the event, or any combination thereof. In some embodiments, the data captured by the debug registers can include metric data (e.g., data relating to metrics used by the memory sub-system), error handling data (e.g., types of error handling operations performed), queueing data, etc.

In response to capturing the event data, the snapshot management component 113 can disable write operations on the set of debug registers. In some embodiments, snapshot management component 113 can disable write operations on a set of debug register in response to determining that the last debug register of the set captured data, in response to detecting an indicator, etc. By disabling write operations, snapshot management component can prevent a subsequent memory access command from overwriting the captured event data prior to the snapshot management component 113 extracting the captured event data from the set of debug registers.

Furthermore, in response to capturing the event data, snapshot management component 113 can further set an indication (e.g., a flag, a bit, etc.) that the set of debug registers contain event data. In an embodiment, the indication can be set in a table (e.g., a metadata table) maintained by snapshot management component 113 and/or local media controller 135. Responsive to detecting the indication that the set of debug registers contains event data, the snapshot management component 113 can extract the event data from the set of debug registers and generate a data structure (e.g., a log file). The data structure can be formatted using any desired format (e.g., an executable and linkable format (ELF), and stored on the memory device 130 and/or 140.

In some embodiments, the snapshot management component 113 can send the data structure to the host system 120. In some embodiments, the snapshot management component 113 can append the data structure to the memory access command. For example, in response to receiving a read command, the snapshot management component 113 can capture the event data relating to the read command, using the set of debug registers, and then append the data structure containing the event data to read data sent to the host system 120. In some embodiments, the snapshot management component 113 can send the data structure to the host system 120 independent of the memory access command using, for example, an interface (e.g., Non-Volatile Memory Express (NVMe), SMBus, etc.).

In some embodiments, each debug register of the memory sub-system 110 can be configurable by the host system 120. In particular, the host system 120 can configure which type of data for which type of event is captured by each debug register. For example, the host system 120 can configure that a first debug register records timer data relating to retrieving the memory access command from a memory access command queue, that a second debug register records timestamp data to error handling operations performed on the memory access command, and so forth.

In an exemplary example, memory device 130 and/or 140 can include two sets debug registries. Both sets of debut registers can initially be set to read-only mode. In response to detecting that a memory access command satisfies the trigger condition, the snapshot management component 113 can enable write operations on the first of the two sets of debug registers. In response to capturing the event data, the snapshot management component 113 can disable write operations on the first set of debug registers. In response to receiving subsequent memory access command that satisfying the trigger condition, the memory sub-system controller can enable write operations on another set of debug registers (e.g., another set of four debug registers). Thus, each debug register of the second set can be used to capture event data generated by the subsequent memory access command. By switching to the second set of debug registers, the memory sub-system controller can capture event data relating to the subsequent memory access command while extracting captured data from the first set of debug registers. It should be understood that any number of debug register sets can be used by in accordance with aspects of the present disclosure (e.g., one set, two sets, three sets, and so forth). The snapshot management component 113 can cycle between debug register sets for each memory access command that satisfies a trigger condition.

Figure 2:
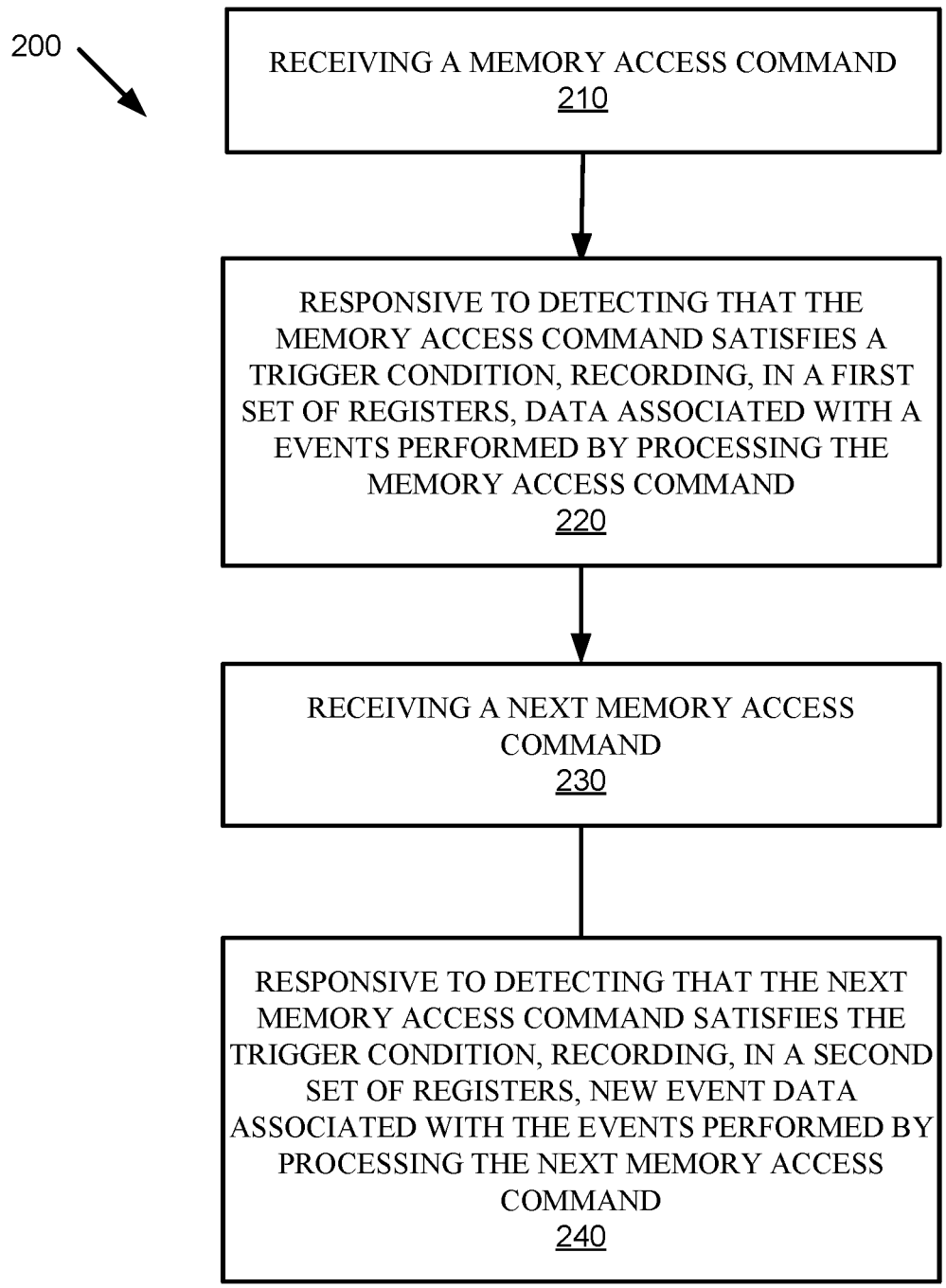
FIG. 2 is a flow diagram of an example method illustrating processes performed for snapshot process operations in the memory device, in accordance with some embodiments of the present disclosure.

FIG. 2 is a flow diagram of an example method 200 illustrating processes performed for snapshot process operations in the memory device, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the snapshot management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic can receive a memory access command. For example, the processing logic can receive a write command, a read command, an erase command, a deallocate command, etc.

At operation 220, responsive to detecting that the memory access command satisfies a trigger condition, the processing logic can record data (e.g., event data) associated with events performed by processing the memory access command. The processing logic can record the data in a first set of debug registers. The trigger condition can be related to logical address information of the memory access command, the memory access command type, a periodic command, a firmware based trigger, or a hardware based trigger. The event data can include time data, metric data, error handling data, queueing data, etc. In some embodiments, responsive to detecting that the memory access command satisfies the trigger condition, the processing logic can enable write operations on the first set of debug registers.

In some embodiments, the processing logic can set an indication that the first set of debug registers include the event data. Responsive to detecting the set indication, the processing logic can extract the event data from the first set of debug registers. The processing logic can then generating a log containing the event data from the first set of debug registers. In some embodiments, the processing logic can append the event data from the first set of debug registers to data (e.g., read data) retrieved by the memory access command. In some embodiments, responsive to detecting that the first set of debug registers contains the event data, the processing logic can disable write operations on the first set of debug registers.

At operation 230, the processing logic can receive a next memory access command.

At operation 240, responsive to detecting that the next memory access command satisfies the trigger condition, the processing logic can record, in a second set of debug registers, new event data relating to the events performed by processing the next memory access command. In some embodiments, responsive to detecting that the next memory access command satisfies the trigger condition, the processing logic can enable write operations on the second set of debug registers. In some embodiments, the processing logic can set an indication that the second set of debug registers include the new event data. Responsive to detecting the set indication, the processing logic can extract the new event data from the second set of debug registers. The processing logic can then generating a log containing the new event data from the second set of debug registers. In some embodiments, the processing logic can append the event data from the second set of debug registers to data retrieved by the next memory access command. In some embodiments, responsive to detecting that the second set of debug registers contains the new event data, the processing logic can disable write operations on the second set of debug registers.

Figure 3:
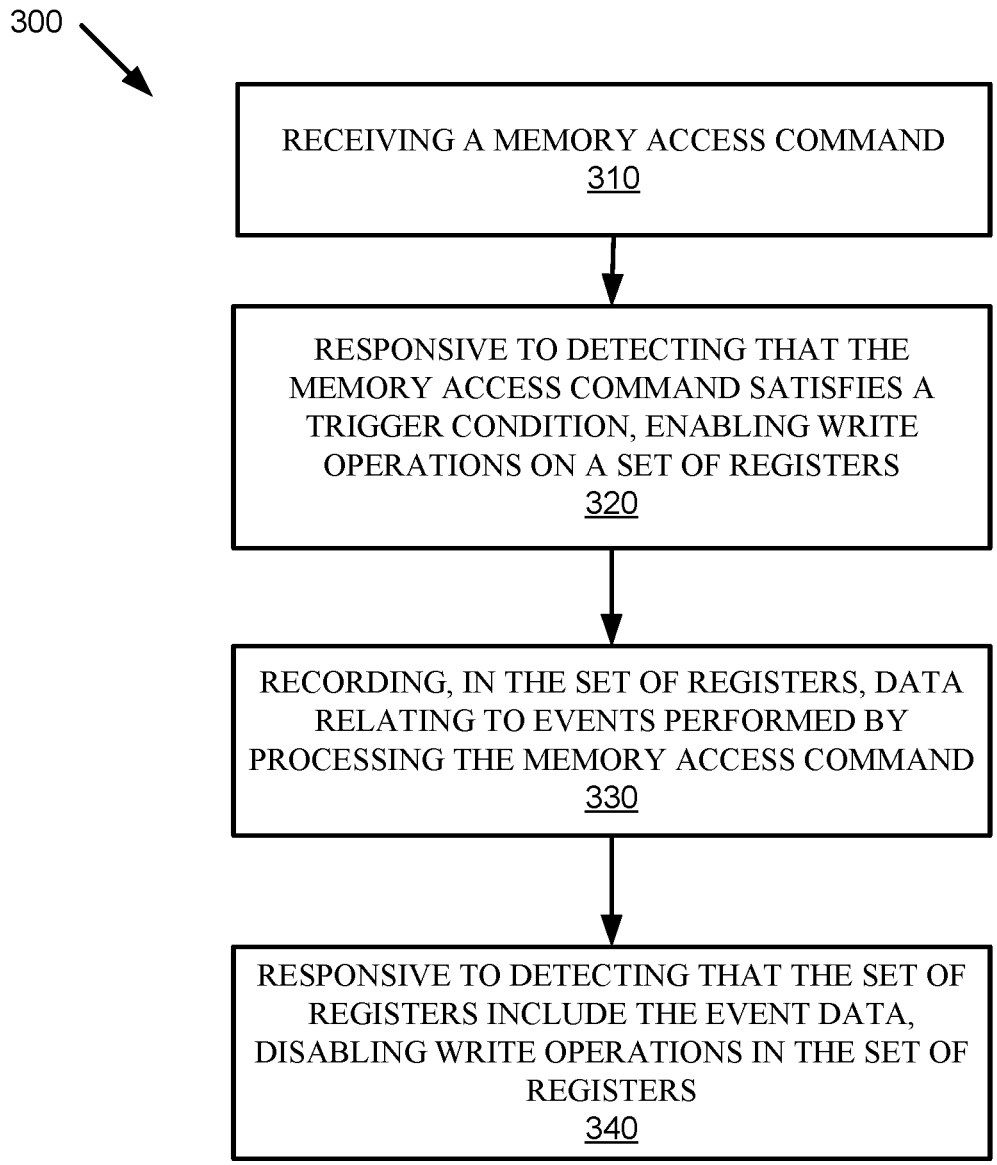
FIG. 3 is a flow diagram of another example method illustrating processes performed for snapshot process operations in the memory device, in accordance with some embodiments of the present disclosure.

FIG. 3 is a flow diagram of another example method 300 illustrating processes performed for snapshot process operations in the memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the snapshot management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic can receive a memory access command. For example, the processing logic can receive a write command, a read command, an erase command, a deallocate command, etc.

At operation 320, responsive to detecting that the memory access command satisfies a trigger condition, the processing logic can enable write operations on a set of debug registers. The trigger condition can be related to logical address information of the memory access command, the memory access command type, a periodic command, a firmware based trigger, or a hardware based trigger.

At operation 330, the processing logic can record, in the set of debug registers, data (event data) relating to with events performed by processing the memory access command. The event data can include time data, metric data, error handling data, queueing data, etc.

At operation 340, responsive to detecting that the set of debug registers include the event data, the processing logic can disable write operations in the set of debug registers.

In some embodiments, the processing logic can set an indication that the set of debug registers include the event data. Responsive to detecting the set indication, the processing logic can extract the event data from the set of debug registers. The processing logic can then generating a data structure containing the event data from the set of debug registers. In some embodiments, the processing logic can append the event data from the set of debug registers to data (e.g., read data) retrieved by the memory access command.

Figure 4:
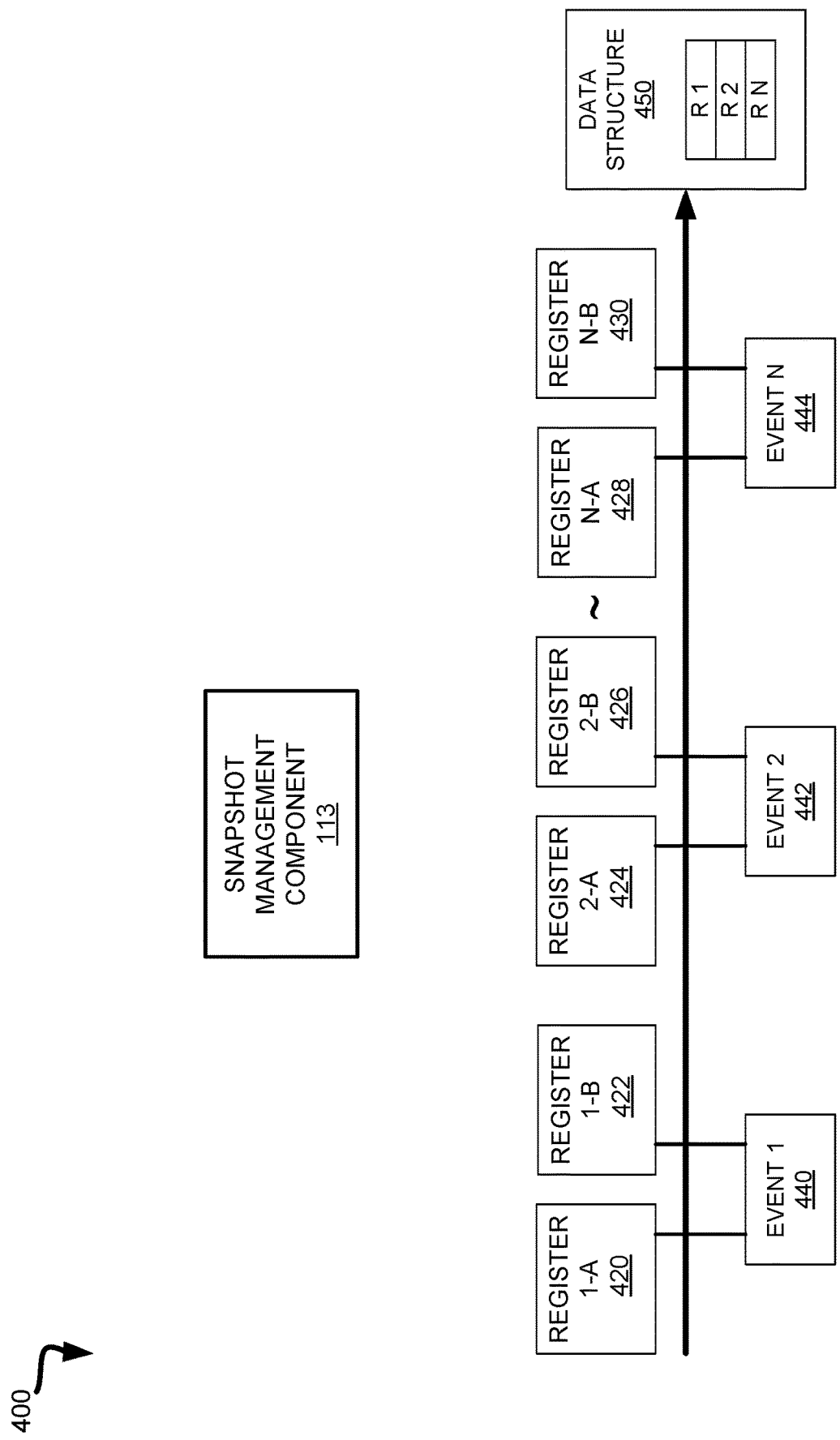
FIG. 4 schematically illustrates example sets of debug registers maintained by memory sub-system, in accordance with some embodiments of the present disclosure.

FIG. 4 schematically illustrates example sets of debug registers maintained by memory sub-system 400, in accordance with some embodiments of the present disclosure. Memory sub-system 400 can be similar to memory sub-system 110.

Memory sub-system 400 includes snapshot management component 113 and two sets of debug registers. The first set of debug registers include debug register 1-A 420, debug register 2-A 424, and debug register N-A 428. The second set of debug registers include debug register 1-B 422, debug register 2-B 426, and debug register N-B 430. A debug register from each set can be can assigned to record data from a preconfigured event. For example, debug registers 1-A 420 and 1-B 422 can be assigned to record data from event 1 (440), debug registers 2-A 424 and 2-B 426 can be assigned to record data from event 2 (442), and debug registers N-A 428 and N-B 430 can be assigned to record data from event 3 (444).

Responsive to detecting that a memory access command satisfies a trigger condition, the snapshot management component 113 can enable write operations on the first set of debug registers and record event data associated with events performed by processing the memory access command. Data relating to event 1 (440) can be recorded by debug register 1-A 420, data relating to event 2 (442) can be recorded by debug register 2-A 424, and data relating to event 3 (444) can be recorded by debug register N-A 428. In some embodiments, snapshot management component 113 can set an indication that the first set of debug registers include the event data, and extract the event data from the first set of debug registers. The snapshot management component 113 can then generating data structure 450 containing the event data from the first set of debug registers. Responsive to detecting that the first set of debug registers contains the event data, snapshot management component 113 can disable write operations on the first set of debug registers.

Responsive to detecting that a next memory access command satisfies the trigger condition, the snapshot management component 113 can enable write operations on the second set of debug registers and record, in the second set of debug registers, new event data relating to the events performed by processing the next memory access command. For example, data relating to event 1 (440) can be recorded by debug register 1-B 424, data relating to event 2 (442) can be recorded by debug register 2-B 426, and data relating to event 3 (444) can be recorded by debug register N-B 430. In some embodiments, snapshot management component 113 can set an indication that the second set of debug registers includes the event data, and extract the new event data from the second set of debug registers. The snapshot management component 113 can then generate another data structure 450 containing the event data from the second set of debug registers. Responsive to detecting that the second set of debug registers contains the event data, the snapshot management component 113 can disable write operations on the second set of debug registers. Responsive to another memory access command that satisfies the trigger condition, the snapshot management component 113 can enable write operations on the first set of debug registers and alternate between the first set of debug registers and the second set of debug registers.

Figure 5:
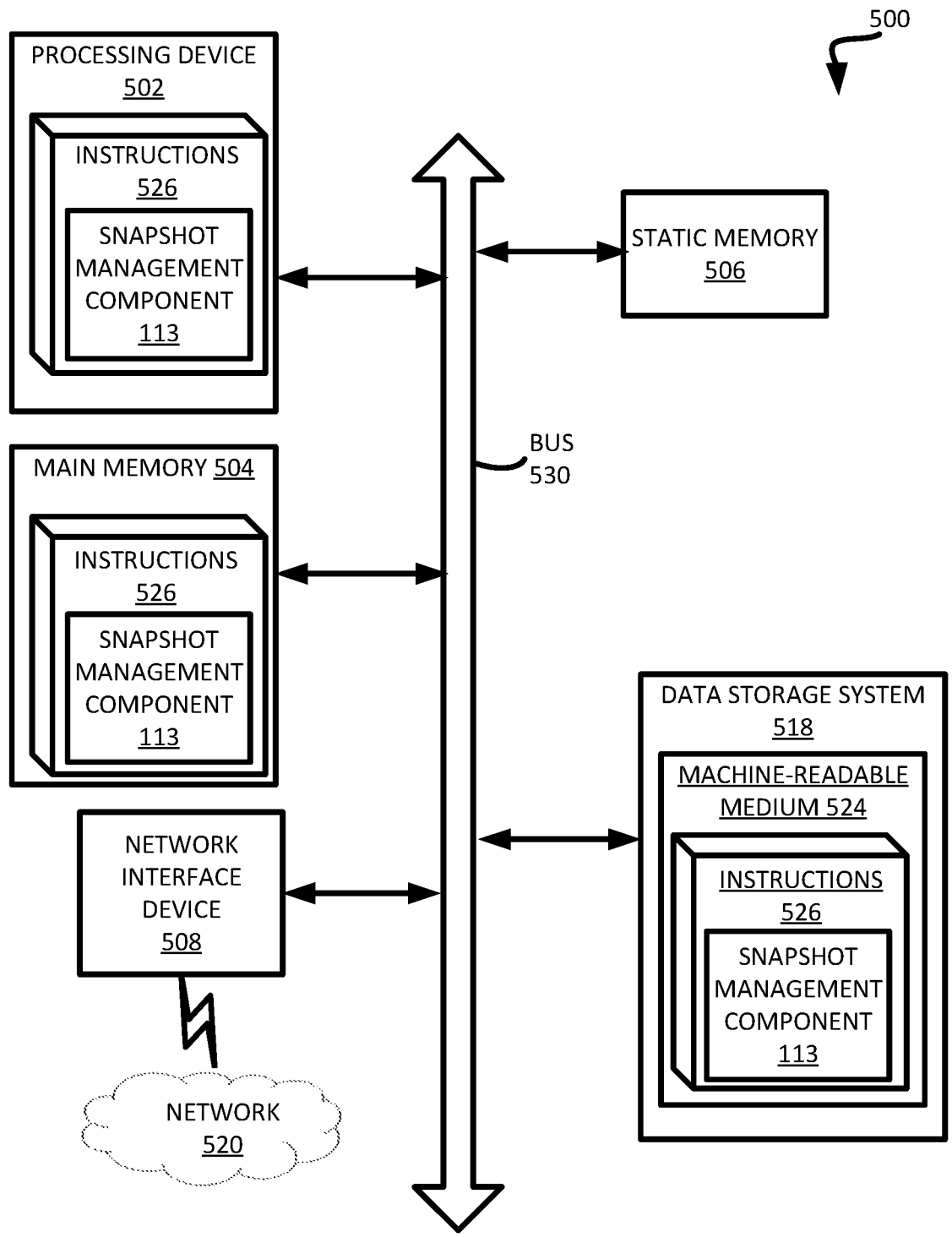
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to snapshot management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530. Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to snapshot management component 113 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving, by a processing device, a memory access command;
responsive to detecting that the memory access command satisfies a trigger condition, enabling write operations in a set of registries;
recording, in the set of registers, data associated with a plurality of events performed by processing the memory access command; and
responsive to detecting that the set of registers comprises the data, disabling write operations in the set of registers.

2. The method of claim 1, further comprising:
appending the data from the set of registers to data retrieved by the memory access command.

3. The method of claim 1, further comprising:
generating a data structure comprising the data from the set of registers.

4. The method of claim 1, wherein the trigger condition comprises at least one of logical address information, memory access command type, a periodic command, a firmware based trigger, or a hardware based trigger.

5. The method of claim 1, further comprising:
setting an indication that the set of registers comprise the data; and
responsive to detecting the set indication, extracting the data from the set of registers.

6. The method of claim 1, wherein the data comprises at least one of time data, metric data, error handling data, or queueing data.

7. A non-transitory computer-readable storage medium comprising instructions that, when executed by a processing device operatively coupled to a memory device, performs operations comprising:
receiving a first memory access command;
responsive to detecting that the first memory access command satisfies a trigger condition, recording, in a first set of registers, first data associated with a plurality of events performed by processing the first memory access command;
responsive to detecting that the first set of registers comprises the first data, disabling write operations on the first set of registers;
receiving a second memory access command; and
responsive to detecting that the second memory access command satisfies the trigger condition, recording, in a second set of registers, second data associated with a plurality of events performed by processing the second memory access command.

8. The non-transitory computer-readable storage medium of claim 7, wherein the processing device is to perform further operations comprising:
appending the first data from the first set of registers to data retrieved by the memory access command.

9. The non-transitory computer-readable storage medium of claim 7, wherein the processing device is to perform further operations comprising:
generating a data structure comprising the first data from the first set of registers.

10. The non-transitory computer-readable storage medium of claim 7, wherein the processing device is to perform further operations comprising:
responsive to detecting that the first memory access command satisfies the trigger condition, enabling write operations in the first set of registers.

11. The non-transitory computer-readable storage medium of claim 7, wherein the processing device is to perform further operations comprising:
setting an indication that the first set of registers comprise the first data; and
responsive to detecting the set indication, extracting the first data from the first set of registers.

12. A system comprising:
a memory device; and
a processing device, operatively coupled with the memory device, to perform operations comprising:
receiving a first memory access command;
responsive to detecting that the first memory access command satisfies a trigger condition, recording, in a first set of registers, first data associated with a plurality of events performed by processing the first memory access command;
responsive to detecting that the first set of registers comprises the first data, disabling write operations on the first set of registers;
receiving a second memory access command; and
responsive to detecting that the second memory access command satisfies the trigger condition, recording, in a second set of registers, second data associated with a plurality of events performed by processing the second memory access command.

13. The system of claim 12, wherein the processing device is to perform further operations comprising:
appending the first data from the first set of registers to data retrieved by the memory access command.

14. The system of claim 12, wherein the processing device is to perform further operations comprising:

generating a data structure comprising the first data from the first set of registers.

15. The system of claim 12, wherein the trigger condition comprises at least one of logical address information, memory access command type, a periodic command, a firmware based trigger, or a hardware based trigger.

16. The system of claim 12, wherein the processing device is to perform further operations comprising:
responsive to detecting that the first memory access command satisfies the trigger condition, enabling write operations in the first set of registers.

17. The system of claim 12, wherein the processing device is to perform further operations comprising:
setting an indication that the first set of registers comprise the first data; and
responsive to detecting the set indication, extracting the first data from the first set of registers.

18. The system of claim 12, wherein the first data comprises at least one of time data, metric data, error handling data, or queueing data.

* * * * *